United States Patent
Debnath et al.

(10) Patent No.: US 8,835,536 B2
(45) Date of Patent: Sep. 16, 2014

(54) HIGHLY SILICA LOADED STYRENE BUTADIENE RUBBER MASTERBATCH

(75) Inventors: Subir Debnath, Baton Rouge, LA (US); Mark Arigo, Baton Rouge, LA (US)

(73) Assignee: Lion Copolymer Holdings, LLC, Geismar, LA (US)

(*) Notice: Subject to any disclaimer, the term of this patent is extended or adjusted under 35 U.S.C. 154(b) by 82 days.

(21) Appl. No.: 13/560,858

(22) Filed: Jul. 27, 2012

(65) Prior Publication Data

US 2013/0203914 A1    Aug. 8, 2013

Related U.S. Application Data

(60) Provisional application No. 61/594,259, filed on Feb. 2, 2012.

(51) Int. Cl.
*C08J 3/20* (2006.01)

(52) U.S. Cl.
USPC ............ 523/351; 524/262; 524/263; 524/267; 524/269; 524/492; 524/493

(58) Field of Classification Search
USPC .......... 523/351; 524/262, 263, 267, 269, 492, 524/493
See application file for complete search history.

(56) References Cited

U.S. PATENT DOCUMENTS

| | | |
|---|---|---|
| 2,384,543 A | 9/1945 | Fryling |
| 4,076,550 A | 2/1978 | Thurn et al. |
| 4,076,769 A | 2/1978 | Watts |
| 4,104,323 A | 8/1978 | Hansen |
| 4,213,888 A | 7/1980 | Karg et al. |
| 5,093,407 A | 3/1992 | Komai et al. |
| 5,304,591 A | 4/1994 | Nowakowsky et al. |
| 5,504,168 A | 4/1996 | Maestri et al. |
| 5,763,388 A | 6/1998 | Lightsey et al. |
| 5,985,953 A | 11/1999 | Lightsey et al. |
| 6,197,384 B1 | 3/2001 | Schubert et al. |
| 6,346,579 B1 | 2/2002 | Zanzig et al. |
| 6,403,693 B2 | 6/2002 | Materne et al. |
| 6,579,929 B1 | 6/2003 | Cole et al. |
| 6,635,700 B2 | 10/2003 | Cruse et al. |
| 6,921,785 B2 | 7/2005 | Campbell et al. |
| 7,335,807 B2 | 2/2008 | Hochgesang |
| 7,585,914 B2 | 9/2009 | Tsou et al. |
| 2003/0097966 A1 | 5/2003 | Stephens et al. |
| 2004/0071626 A1 | 4/2004 | Smith et al. |
| 2005/0256267 A1 | 11/2005 | Hochgesang |
| 2005/0277717 A1 | 12/2005 | Joshi et al. |
| 2006/0100320 A1 | 5/2006 | Dalphond et al. |
| 2007/0106024 A1 | 5/2007 | Tsou et al. |
| 2007/0260005 A1 | 11/2007 | Karato et al. |
| 2008/0221274 A1 | 9/2008 | Jourdain |
| 2008/0293889 A1 | 11/2008 | Obrecht |
| 2009/0124730 A1 | 5/2009 | Matsuda et al. |
| 2009/0137716 A1 | 5/2009 | Furukawa et al. |
| 2010/0022684 A1 | 1/2010 | Wallen et al. |
| 2011/0060078 A1 | 3/2011 | Becker et al. |
| 2011/0165356 A1 | 7/2011 | Harris et al. |
| 2011/0166262 A1 | 7/2011 | Harris et al. |
| 2011/0166263 A1 | 7/2011 | Rikhoff et al. |
| 2011/0166265 A1 | 7/2011 | Harris et al. |

FOREIGN PATENT DOCUMENTS

| | | |
|---|---|---|
| CA | 1242832 | 10/1988 |
| CA | 2724798 | 1/2010 |
| JP | 2005-33019 | 12/2005 |

*Primary Examiner* — Edward Cain

(74) *Attorney, Agent, or Firm* — Buskop Law Group, PC; Wendy Buskop

(57) ABSTRACT

A highly loaded silica wet masterbatch utilizing a functionalized silica dry precipitated silica with a specific surface area in the range of 100 to 300 $m^2/gm$ treated with a plurality of silanes coupling agents to form a wet polymer silica masterbatch, then blending the masterbatch with a latex rubber component that includes a styrene-butadiene copolymer rubber or a blend of the styrene-butadiene copolymer rubber and another conjugated diene base rubber using a plurality of coupling agents simultaneously.

11 Claims, No Drawings ated on Feb. 2, 2012, entitled "FUNCTIONALIZED SILICA FOR
HIGHLY SILICA LOADED STYRENE BUTADIENE RUBBER MASTERBATCH

CROSS REFERENCE TO RELATED APPLICATIONS

The present application claims priority to and the benefit of U.S. Provisional Patent Application Ser. No. 61/594,259 filed on Feb. 2, 2012, entitled "FUNCTIONALIZED SILICA FOR RUBBER MASTERBATCH." This reference is hereby incorporated in its entirety.

FIELD

The present embodiments generally relate to a high silica loaded wet polymer silica masterbatch.

BACKGROUND

A need exists for a masterbatch formed of a rubber composite with a high silica content.

A need exists for a rubber composition that can be made into a tire formed using an emulsion styrene butadiene rubber process.

A need exists for a pretreated silica having two, or three silanes coupled to the silica which can then added to the rubber formulation for stronger coupling and reduced presence of sulfur in the final formulation.

A need exists for an improved tire has excellent wet skid resistance, excellent grip performance on a dry road surface, and excellent abrasion resistance which can be made with the high loaded silica wet masterbatch of the present invention.

The present embodiments meet these needs.

DETAILED DESCRIPTION OF THE EMBODIMENTS

Before explaining the present formulation in detail, it is to be understood that the formulation is not limited to the particular embodiments and that it can be practiced or carried out in various ways.

The present embodiments relate to a high silica loaded wet polymer silica masterbatch for rubber tires with 30 weight percent to 50 weight percent styrene butadiene rubber; and 40 weight percent to 80 weight percent of a functionalized silica formed from dry precipitated silica with a specific surface area in the range of 100 to 300 m²/gm.

A benefit of this formulation is the creation of a rubber composite has high loads of silica over 40 weight percent using a latex styrene butadiene rubber.

A benefit of the formulation is the ability to create wet masterbatch with an enhanced flexibility for rubber end users, that is, a masterbatch that is easier to blend and process than dry silica with latex, and offers high loading into the rubber matrix, that is a loading which is greater than 40 weight percent silica into the rubber.

The higher loaded wet masterbatch of silica gives more flexibility to rubber compounders which can then create different end products as they do not have to add free silica, and can add additional ingredients, such as oils, pigments, to wet masterbatchs, instead of additional silica while still maintaining properties of durability and long life.

New rubber products are moving towards higher loadings of silica, upwards of 120 pHr of loading. New applications for tires require higher loading of silica to modify their formulations, requiring less energy and more immediate use of the formulations.

The process allows a user to more easily process rubber compounds with shorter mixing times, lower extrusion temperatures, and greater homogenous dispersion of the silica in the rubber.

The use of highly loaded silica wet masterbatches provides a resultant rubber composite with uniform properties, such as, uniform brittleness, uniform flexibility and uniform elongation.

Resultant tire formulations using this wet masterbatch result in a more granular crumb form with an ability to undergo extrusion type processing.

The embodiments provide a pathway to incorporate all or a majority of the silica by the end users without having to adjust dry silica to obtain the desired loading.

The wet masterbatch reduces final composition Tg shift by incorporating lower amounts of wet styrene butadiene rubber and oil associated with the silica in the matrix that is higher amounts of silica.

The formulation uses a dry silica coupled to one, two or more silane coupling agents to reduce sulfur content, and thereby provide a formulation with improved rolling resistance, (measured by tangent delta at 60 degrees Celsius).

In an embodiment, the dry silica starting material can be powder, pellets or flakes.

The silica can have from 4 weight percent to 8 weight percent moisture and up to 10 percent moisture and still be usable herein.

The dry silica usable herein has a specific surface area in the range of from 100 to =300 m²/gm.

The dry silica that is powdered usable herein can be HISIL™ 233 available from PPG Industries of Pittsburgh, Pa.

In an embodiment, the dry silica is not pretreated, before being introduced to the silanes, and in that case, the dry silica can be flakes/granular material also available from PPG as HISIL.

In embodiments, the silane coupling agents can be added directly to the rubber formulation in an internal mixer through dry blending, and then are introduced into the rubber only after the silanes are attached onto the silica filler, such as during dry blending or during wet masterbatch process.

The individual coupling agents of the blend of coupling agents are chosen for the synergistic effects observed in desirable compound properties like lower rolling resistance, enhanced tear strength and mechanicals.

The individual coupling agents can be silane coupling agents and can contain one or more of the following functionalities, polysulfide, mercapto, thiocyanato, alkoxy, halogen, amino or no [—CH$_2$— linkages].

The two or more silanes of this highly loaded silica wet masterbatch have individual weight percentages ranging from 0.1 weight percent to 99.9 weight percent of the total filler weight percentage in the formulation. In an embodiment one silane can be used in the wet masterbatch in amounts from 1 weight percent to 15 weight percent while the second silane can also be used in the wet masterbatch in amount from 1 weight percent to 15 weight percent based on the total formulation.

In an embodiment, the silane can be attached to the silica such as by spraying the silane onto the silica while mixing such as in a ribbon blender.

Additives and other components can be added to the silica wet masterbatch by three different techniques, namely:
(i) Direct addition into the wet masterbatch with the pretreated silica already in the latex using an internal mixer, extruder, or other compounding mixer while other compound ingredients are added, such as oil extenders, a carbon black as an antistatic agent, a colorant, such as a pigment, an additive, an antioxidant, or combinations of these other compound ingredients;

(ii) Adding the additives first to the silica pretreated with the at least two silane coupling agents prior to adding to the wet masterbatch, or (iii) Incorporating the silica pretreated with the two or more silane coupling agents to the compounding materials then adding the blend to the wet rubber master batch in a blender.

The final rubber composite can contain from 40 weight percent to 80 weight percent silica and can be used with 30 weight percent to 50 weight percent of styrene-butadiene, (SBR), natural rubber, synthetic rubber copolymer of acrylonitrile (ACN) and butadiene also known as Buna-N, Perbunan (NBR).

The final rubber composite can contain from 40 weight percent to 70 weight percent silica by weight and can be used with styrene-butadiene, (SBR), synthetic rubber copolymer of acrylonitrile (ACN) and butadiene also known as Buna-N, Perbunan, (NBR).

Styrene-butadiene or styrene-butadiene rubber (SBR) is a synthetic rubber copolymer consisting of styrene and butadiene. SBR has abrasion resistance and good aging stability when protected by additives, and is widely used in tires, where it can be blended with natural rubber.

SBR can be produced by two basically different processes: from solution (S-SBR) or as emulsion.

In the emulsion process, low pressure reaction vessels are required and usually charged with styrene and butadiene, the two monomers, a free radical generator and a chain transfer agent such as an alkyl mercaptan and water. Mercaptans controls molecular weight and high viscosity product from forming.

Nitrile butadiene rubber (NBR) is a family of unsaturated copolymers of 2-propenenitrile and various butadiene monomers (1,2-butadiene and 1,3-butadiene) usable herein. Although the physical and chemical properties of NBR vary depending on the polymer's composition of nitrile, this form of synthetic rubber is generally resistant to oil, fuel, and other chemicals (the more nitrile within the polymer, the higher the resistance to oils but the lower the flexibility of the material.

Nitrile rubber lattices, along with other rubber compound ingredients, including other rubbers, stabilizers, extenders, and additives can be highly loaded with the silica to form a wet masterbatch usable for tires.

A high silica loaded wet polymer silica masterbatch can be made from 30 weight percent to 50 weight percent styrene NBR; and 40 weight percent to 80 weight percent of a functionalized silica made from two silanes attached to a dry precipitated silica with a specific surface area in the range of 100 to 300 m²/gm; wherein at least 0.1 weight percent to 25 weight percent of the plurality of silane coupling agents is used.

The resultant wet masterbatch can produce a tire material that will release less volatile organic compounds, such as ethanol, in-part because a coupling of ethoxy groups or methoxy groups with two different silanol groups with silica, significantly reducing the possibility of ethanol or methanol evolution.

The resultant rubber material made from the masterbatch is expected to improve safety in a chemical plant making the final rubber product by reducing the presence of volatile organic compounds in the plant containing the resultant product, thereby reducing the chance of a fire or chance of an explosion or chance of a major incident, from a reaction with ethanol vapors.

The formulation can improve the American economy because the highly loaded silica wet masterbatch composition is expected to produce tires with improved gas mileage allowing compliance with a corporate average fleet economy (CAFÉ) regulation, such as 35 mpg, which allows the American consumers to save money on gasoline. This high loaded silica formulation will result in products that prevent fines from being levied on American car manufacturers making them more competitive in the world marketplace.

The following is more detail on the ingredients that can be used in creating the unique high loaded silica masterbatch.

One of the silicas usable herein can be HISIL™ from PPG Industries of Pittsburgh, Pa., known as HISIL 233 that has the following chemical/physical properties: a surface area of 125 meters square per gram to 145 meters squared per gram.

Another of the silicas usable herein can be a pretreated silica that has be pretreated other than with one or two of the aforementioned silanes.

The pretreated silica can be silica that has been modified to have the following physical and/or chemical parameters: a loss on drying ranging from about 0.1 weight percent to about 10 percent as determined by the Deutsches Institut Fur Normung E.V. (DIN), International Organization for Standardization (ISO) 787/2; a loss on ignition ranging from 2 percent to 25 percent as determined by the Deutsches Institut Fur Normung E.V., International Organization for Standardization (ISO) 3262/11; a methanol wettability ranging from weight percent to weight percent (titrated); a carbon content ranging from weight percent to weight percent and a sulfur content ranging from 0.1 weight percent to 10 weight percent.

The silica used in the formulation can be from 10 weight percent to 50 weight percent of the final composite.

A first silane usable with the dry silica or pretreated silica can be an organosilicon derived from an organic silane having the structure: $Z_1Z_2Z_3Si(CH_2)_yX(CH_2)_ySIZ_1Z_2Z_3$. Within the structure, X can be a polysulfide, Y can be an integer equal to or greater than 1, and $Z_1$, $Z_2$, and $Z_3$ can each be independently selected from the group consisting of hydrogen, alkoxy, halogen, and hydroxyl.

A second silane can be an organosilicon, which can be derived from an organic silane having the chemical structure

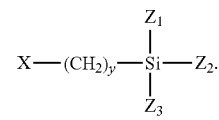

Within the chemical structure, the X can be a functional group selected from the group consisting of: hydrogen, an amino group, a polyamino alkyl group, a mercapto group, a thiocyanato group, an epoxy group, a vinyl group, a halogen, an acryloxy group, and a methacryloxy group. Within the chemical structure, the Y can be an integer equal to or greater than 0. Within the chemical structure, the $Z_1$, $Z_2$, and $Z_3$ can each be independently selected from the group consisting of: hydrogen, alkoxy, halogen, and hydroxyl.

A third silane can be added simultaneously forming the high loaded silica wet masterbatch while using the first and second coupling agents to produce a 35 mph tire as a final product with this masterbatch. The third coupling agent can be an ethanol free silane, such as those from the family of NXT™ silanes available from Momentive Performance Materials of Wilton, Conn.

The third type of silane has a silicon end of the molecule with silicon atoms bridged through non-volatile diols. The mercapto and blocked mercapto groups of this third silane offer different coupling reactivity with the polymer than the first two mentioned silanes. It is by combining at least two silanes that the high loading into the polymer matrix of the silica can be accomplished.

For this third silane, a mercapto group can react with the polymer during non-productive mixing stages while the blocked mercapto group aids in the dispersion of the silica. When the octanoyl-blocking group is removed during the productive mixing stage and curing step, additional mercapto silane is formed. Proton donors occur due to the vulcanization ingredients that assist in the removal of the octanoyl blocking group.

The organosilicon of the first, second or third silane can be bonded to a surface of the silica. The amount of the organosilicon that is bonded to the surface of the silica can range from about 2 weight percent to about 25 weight percent of the silica.

The organosilicon can have three readily hydrolyzable groups attached directly to a silicon atom of the organosilicon.

The organosilicon can have at least one organic group attached directly to the silicon atom of the organosilicon. The organic group can contain at least one functional group.

In embodiments, a first silane coupling compound can contain one functionality from the list namely: polysulfide, mercapto, thiocyanato, halogen, amino, or aliphatic, aromatic, vinylic, cycloalkyl while the second silane can have a different functionality from the same list.

The silica can be coupled to the silane coupling agents using a process in a ribbon blender that involves spraying the silica with the silane, such as with an air carrier, or simply with pressure from a pump onto silica in the ribbon blender or a fluidized bed.

If a ribbon blender is used, the ribbon blender can mix the silanes and the silica at a rate ranging from 5 revolutions per minute to 20 revolutions per minute.

The present embodiments further relate to blending at least two different silanes together and then attaching the silane blend onto the silica, noting that the silica can additionally be pretreated.

The silica coupled to the at least two silanes can be blended into a rubber component that includes a styrene-butadiene copolymer rubber, or a blend of the styrene-butadiene copolymer rubber and another conjugated diene base rubbers as noted above in the description of the SBR and NBR.

The rubber can be a polymeric rubber latex including styrene-butadiene rubber, natural rubber, acrylonitrile-butadiene rubber, polyvinylchloride, acrylonitrile-butadiene-styrene polymer, carboxylated styrene butadiene, carboxylated acrylonitrile-butadiene, styrene-acrylonitrile copolymer, polybutadiene, polyisoprene, polychloroprene, neoprene, polybutadiene-isoprene, or combinations thereof.

The rubber component can also be a polymeric rubber latex of copolymers including a copolymer of: styrene and butadiene, styrene and isoprene, styrene and acrylonitrile, or butadiene and acrylonitrile.

Additives can be added to the masterbatch. An example of a usable additive can be the oil extender SANDEX 8000 EU oil. By adding this oil extender, the resultant formulation can have a lower viscosity and improved processability.

Examples of usable antioxidants can include non-staining Nauguard RM 51 from Chemtura, or a staining antioxidant known as Santoflex 134PD from Flexsys America.

Other additives and fillers to be added into the rubber composition can include lubricants such as wax. Other additives that can be added to the masterbatch can enhance cure, such as zinc oxide and stearic acid.

Additionally resins, such as phenols formaldehyde can be added to the masterbatch as a tackifier for the rubber.

Yet additional additives can be included in the masterbatch such as colorants and pigments such as titanium dioxide as an opacifier.

The resultant rubber formulation made from the masterbatch can be used in the production of car tires, off road vehicle tires, truck tires, lawn mower tires, and similar small vehicle tires.

Formulations with staining properties can be used for tires and inner tubes, conveyor belts, footwear, cables, hosepipes and various technical rubber articles.

Non-staining grades of the composite formed can include rubber appropriate for compounds used in the production of floor coverings, bicycle tires, footwear, children toys, cables, hosepipes and various rubber articles having light color shades.

The formulation can be used to make retreads for tires and soles for safety shoes or tennis shoes.

It can be noted that the treated silica with the coupled silanes can be added to the latex slurry and then coagulated into the silica wet masterbatch.

The coagulating agents can include: a solution of calcium chloride, zinc chloride, salts of aluminum, salts of magnesium, sulfuric acid, citric acid coagulate, ferric chloride, isopropanol, or combinations thereof.

For example, one or more embodiments can include using calcium chloride diluted in water, that is, from about 0.5 weight percent to about 5 weight percent of the calcium chloride in the water forming a calcium chloride solution can be used as the coagulant.

In an embodiment, the latex slurry can be added to a coagulant, such as the calcium chloride solution, while continually stifling.

The addition can occur at a rate of 10 gallons a minute, with the coagulant at an ambient temperatures and the latex at 70 degrees Celsius and for a time sufficient to obtain a uniform mixture as observed by visual inspection.

After coagulation of the latex slurry, such as for between 30 seconds and 10 minutes, the functionalized silica loaded polymeric rubber composite is formed.

In one or more embodiments, the formulation can include using a functionalized silica for blending with organic polymers that is made from dry silica with at least 0.1 weight percent to 25 weight percent of a plurality of silane coupling agents simultaneously.

In embodiments, the functionalized silica can have a sulfur content ranging from 0.1 weight percent to 10 weight percent.

In an embodiment, an organosilicon of the silane that bond to the surface of the silica, can have three readily hydrolyzable groups attached directly to a silicon atom of the organosilicon, allowing at least one organic group to attach directly to the silicon atom.

In an embodiment, the organosilicon bonded to a surface of the silica has an organic group attached directly to a silicon atom of the organosilicon which contains at least one functional group.

If a mercapto group is used in one of the silanes, the mercapto group can reduce the masterbatch sulfur content from 0.1 weight percent to 10 weight percent.

The highly loaded silica wet masterbatch can be made from an emulsion latex of a styrene butadiene synthetic rubber; which can be NBR, and a functionalized silica comprising dry silica with at least 0.1 weight percent to 25 weight percent based on the weight of the silica of the plurality of silane coupling agents simultaneously.

For the wet polymer silica masterbatch, the styrene butadiene rubber can be an emulsion styrene butadiene rubber latex with from 10 weight percent to 75 weight percent polymer molecules in water.

In an embodiment, the wet polymer silica masterbatch can include an oil extender, forming a polymer rubber composite with from 50 weight percent to 60 weight percent of the functionalized silica and from 1 weight percent to 35 weight percent of the oil extender, and from 30 weight percent to 98 weight percent of the styrene butadiene rubber.

In one or more embodiments, an example of an oil extender can be SANDEX 8000 EU oil that when added creates a rubber composite with a lower Mooney viscosity and improved processability for resultant products.

In one or more embodiments, the wet polymer silica masterbatch can include an antioxidant. If only an antioxidant is used, the formed polymer rubber composite can have from 50 weight percent to 60 weight percent of the functionalized silica, from 0.1 weight percent to 2 weight percent of an antioxidant, and from 67 weight percent to 99 weight percent of the styrene butadiene resin.

In one or more embodiments, an antioxidant can be added to these formulations, such as a non-staining antioxidant, such as Nauguard™ RM 51 from Chemtura, or a staining antioxidant known as Santoflex 134PD from Flexsys America.

In one or more embodiments, the oil extender can be added with an antioxidant to the formulation to produce a usable high loaded silica masterbatch.

EXAMPLE 1

Forming a Functionalized Silica by Spraying Blends of Silane onto Silica Using an Air Carrier and Mixing the Sprayed Silanes into the Silica Using a Ribbon Blender In this example, 0.35 pounds of Si69 silane and 0.35 pounds of n-octyl triethoxysilane OTES from Gelest are stirred together in a beaker or other vessel for about 10 minutes at an ambient temperature.

Once the silanes are blended, 5 pounds of silica is placed into a ribbon blender.

0.7 pounds of the blended silanes of Si69 and octyl triethoxysilane, and 0.1 pounds of acetic acid are then sprayed over the 5 pounds of dry silica in the ribbon blender and the mixture is allowed to tumble at an ambient temperature for about 1 hour in the ribbon blender The silanes can be sprayed into the silica using a pump which increases flow pressure using a narrow tube with 1-2 mm diameter pin holes and a conical flow pattern.

The temperature in the ribbon blender is then raised to 120 degrees Celsius and blending is continued at the elevated temperature for 2 hours.

The blender is allowed to cool to an ambient temperature and the treated silica is discharged from the ribbon blender.

The treated silica is then weighed to produce a slurry with 17 weight percent silica with the silanes coupled thereto in water. The silica/silanes and the water are stirred at room temperature under high shear blending conditions for about an hour.

EXAMPLE 2

Forming a Polymeric Rubber Composite Using Pretreated Silica

In this example, a slurry of silanes is created as in Example 1.

The silanes are deposited on the silica such as by spraying as described to form the treated silica with silanes coupled thereto.

The treated silica is then added to a carrier to make a slurry with 17 percent treated silica in water. The treated silica slurry is then heated forming a silica heated slurry.

Separately, about 17 pounds of preheated polymer rubber latex with 21 weight percent solids is blended with 0.1 pounds non-staining antioxidant Naugard™ RM51 emulsion, and 1.3 pounds of Ergon BO300 oil emulsion are blended at a temperature of 70 degrees Celsius for a time period of 5 minutes forming a latex slurry.

The silica heated slurry is added to the latex slurry, forming a blend of two slurries.

The blend of the two slurries is mixed while maintaining a temperature of about 70 degrees Celsius for a time period of about 2 minutes until uniform mixing is achieved by visual inspection.

Coagulant is slowly added to the heated blend of two slurries changing the pH of the blend to a desired pH to provide desired coagulated crumb rubber properties.

While these embodiments have been described with emphasis on the embodiments, it should be understood that within the scope of the appended claims, the embodiments might be practiced other than as specifically described herein.

What is claimed is:

1. A high silica loaded polymer silica masterbatch comprising:
   a. from 30 weight percent to 50 weight percent styrene butadiene rubber; and
   b. from 40 weight percent to 80 weight percent of a functionalized silica comprising:
      (i) dry precipitated silica with a specific surface area in the range of 100 to 300 $m^2/gm$;
      (ii) from 0.1 weight percent to 25 weight percent of a plurality of silane coupling agents simultaneously, wherein the plurality of silane coupling agents comprises:
         (a) a first silane is an organosilicon having a structure: $Z_1Z_2Z_3Si(CH_2)_yX(CH_2)_ySi\ Z_1Z_2Z_3$, wherein X is a polysulfide, wherein Y is an integer equal to or greater than 1; and wherein $Z_1$, $Z_2$, and $Z_3$ are each independently selected from the group consisting of hydrogen, alkoxy, halogen, and hydroxyl, and
         (b) a second silane is an organo silane having a structure

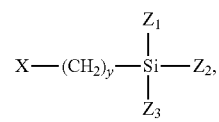

wherein:
1. X is a functional group selected from the group consisting of: a hydrogen, an amino group, a polyamino alkyl group, a mercapto group, a thiocyanato group, an epoxy group, a vinyl group, a halogen, an acryloxy group and a methacryloxy group;

2. Y is an integer equal to or greater than 0; and

3. $Z_1$, $Z_2$, and $Z_3$ are each independently selected from the group consisting of hydrogen, alkoxy, halogen, and hydroxyl, and combinations thereof; and (c) a third silane can be added simultaneously forming the high loaded silica masterbatch.

2. The high silica loaded polymer silica masterbatch of claim 1, further comprising:

a. from 30 weight percent to 50 weight percent of the styrene butadiene rubber; and b. from 50 weight percent to 70 weight percent of a functionalized silica.

3. The high silica loaded polymer silica masterbatch of claim 1, wherein the styrene butadiene rubber is an emulsion styrene butadiene rubber latex with from 10 weight percent to 75 weight percent polymer molecules in water.

4. The high silica loaded polymer silica masterbatch of claim 1, wherein the styrene butadiene rubber comprises: natural rubber, styrene-butadiene rubber, acrylonitrile-butadiene rubber, polyvinylchloride, acrylonitrile-butadiene-styrene polymer, carboxylated styrene butadiene, carboxylated acrylonitrile-butadiene, styrene-acrylonitrile copolymer, polybutadiene, polyisoprene, polychloroprene, neoprene, polybutadiene-isoprene, or combinations thereof.

5. The high silica loaded polymer silica masterbatch of claim 1, wherein the styrene butadiene rubber comprises a copolymer of: styrene and butadiene, styrene and isoprene, styrene and acrylonitrile, or butadiene and acrylonitrile.

6. The high silica loaded polymer silica masterbatch of claim 1, wherein the organo silane has a sulfur content ranging from 0.1 weight percent to 10 weight percent.

7. The high silica loaded polymer silica masterbatch of claim 1, wherein the organosilicon is bonded to a surface of the silica, has three readily hydrolyzable groups attached directly to a silicon atom of the organosilicon, and has at least one organic group attached directly to the silicon atom.

8. The high silica loaded polymer silica masterbatch of claim 1, wherein the organosilicon is bonded to a surface of the silica and has an organic group attached directly to a silicon atom of the organosilicon that contains at least one functional group.

9. The high silica loaded polymer silica masterbatch of claim 1, wherein the mercapto group has a sulfur content ranging between 0.1 weight percent to 10 weight percent.

10. The high silica loaded polymer silica masterbatch of claim 1, further comprising an oil extender, forming a polymer rubber composite with from 40 weight percent to 80 weight percent of the functionalized silica, from 1 weight percent to 35 weight percent of the oil extender, and from 30 weight percent to 98 weight percent of the styrene butadiene rubber.

11. The high silica loaded polymer silica masterbatch of claim 1, further comprising an antioxidant, forming a polymer rubber composite with from 40 weight percent to 80 weight percent of the functionalized silica, from 0.1 weight percent to 2 weight percent of an antioxidant, and from 67 weight percent to 99 weight percent of the styrene butadiene rubber.

* * * * *